US012103821B2

(12) United States Patent
Lee et al.

(10) Patent No.: US 12,103,821 B2
(45) Date of Patent: Oct. 1, 2024

(54) ELEVATOR HAVING FUNCTION OF REMOVING DUST ADHERED TO OBJECT ABOARD

(71) Applicants: GUMYOUNG GENERAL CO., LTD., Seoul (KR); Gum-Gee Lee, Seoul (KR)

(72) Inventors: Gum-Gee Lee, Seoul (KR); Ju Dae Kim, Gyeonggi-do (KR); Hyung Seok Kim, Seoul (KR); Hakki Han, Seoul (KR)

(73) Assignees: Gum-Gee Lee, Seoul (KR); GUMYOUNG GENERAL CO., LTD., Seoul (KR)

( * ) Notice: Subject to any disclaimer, the term of this patent is extended or adjusted under 35 U.S.C. 154(b) by 624 days.

(21) Appl. No.: 17/317,882

(22) Filed: May 11, 2021

(65) Prior Publication Data

US 2021/0395044 A1 Dec. 23, 2021

(30) Foreign Application Priority Data

Jun. 19, 2020 (KR) ........................ 10-2020-0075119

(51) Int. Cl.
*B66B 11/02* (2006.01)
*B08B 5/04* (2006.01)

(52) U.S. Cl.
CPC .............. *B66B 11/024* (2013.01); *B08B 5/04* (2013.01)

(58) Field of Classification Search
CPC ................................ B66B 11/024; B08B 5/04
USPC ........................................... 454/68, 187, 188
See application file for complete search history.

(56) References Cited

U.S. PATENT DOCUMENTS

| | | | | | |
|---|---|---|---|---|---|
| 2,350,389 | A * | 6/1944 | Coulton | B66B 11/024 | 454/68 |
| 2,398,627 | A * | 4/1946 | Disbro | B66B 11/024 | 454/251 |
| 5,354,233 | A * | 10/1994 | Mandy | B66B 11/024 | 454/343 |
| 7,059,958 | B2 * | 6/2006 | Santos | B66B 11/024 | 454/262 |
| 7,284,640 | B2 * | 10/2007 | Lee | B66B 11/024 | 454/68 |

(Continued)

FOREIGN PATENT DOCUMENTS

| | | | | |
|---|---|---|---|---|
| CN | 211594699 U | * 9/2020 | | B66B 11/02 |
| CN | H09273783 A | * 9/2020 | | F24F 7/00 |

(Continued)

*Primary Examiner* — Avinash A Savani
*Assistant Examiner* — Dana K Tighe
(74) *Attorney, Agent, or Firm* — Womble Bond Dickinson (US) LLP

(57) ABSTRACT

The present disclosure relates to an elevator having a function of removing dust adhered to an object aboard, including: a car which provides a boarding space, and in which a pair of air holes disposed in a diagonal direction each other at a same height of an inner space are formed; and a pair of fan modules that generates whirlwind rotating in the inner space of the car by ejecting air traveling from one of the pair of air hoes in a direction away from a center of the inner space of the car and ejecting air traveling from the other of the pair of air hoes in a direction away from the center of the inner space of the car, in which dust adhered to the object aboard inside the car is separated from the object aboard by the whirlwind generated inside the car.

9 Claims, 10 Drawing Sheets

(56) References Cited

U.S. PATENT DOCUMENTS

2019/0056127 A1* 2/2019 Piech ........................ F24F 11/30

FOREIGN PATENT DOCUMENTS

| | | | | |
|---|---|---|---|---|
| CN | H10185273 A * | 9/2020 | ............. | B66B 11/02 |
| KR | 20-0437981 | 1/2008 | | |
| KR | 10-1144967 | 5/2012 | | |
| KR | 10-1973897 | 4/2019 | | |

* cited by examiner (a)

(b)

ELEVATOR HAVING FUNCTION OF REMOVING DUST ADHERED TO OBJECT ABOARD

CROSS-REFERENCE TO RELATED APPLICATIONS

The present application claims priority under 35 U.S.C 119(a) to Korean Patent Application No. 10-2020-0075119, filed on Jun. 19, 2020, which is incorporated herein by reference in its entirety.

BACKGROUND

1. Technical Field

The present disclosure relates to an elevator having a function of removing dust adhered to an object aboard

2. Related Art

In recent years, as diseases caused by dust or foreign matter adhering to the human body have been increasing, there is an increasing number of instances in which a device for removing dust, foreign matter, or the like from a person entering a building by using wind is installed at an entrance of a building. In order to install such a device at the entrance of the building, it is necessary to change a structure of the entrance of the building, so that not only a lot of cost is required, but also there is a problem that an entrance time to the building is increased. For this reason, attempts to remove dust, foreign matter, or the like from a passenger by using wind in an elevator car are increasing. Korean Patent Registration No. 10-1973897 "Apparatus for removing dust in an elevator and method thereof" discloses an apparatus for removing dust from an inside of an elevator cage by blowing air into the cage by installing one or more blowers on a ceiling of the elevator cage.

Korean Patent Registration No. 10-1144967 "Clean elevator car and its boarding room air flow control method" discloses an improved clean elevator car and a control method thereof in which air passing through a filter for removing dust can pass therethrough so that there is no deviation in wind speed, and air from a high polluted floor is not transferred to a low-polluted floor by the elevator car. Korean Utility Model Registration No. 20-0437981 "Elevator with clean room" disclosures a clean room elevator with excellent cleanliness, in which fan motors and filters are installed on an elevator hoistway, a top of the car, and left and right walls, and a floor of the car is constructed with no-electrical static double tiles in which no dust is fused and adhered, so that the cleanliness level can be improved even more than that of the conventional method and the car is maintained in a comfortable state.

However, in the related art described above, there was a problem that since the wind used to remove the dust adhered to the passenger is difficult to reach all over the body of the passenger, and thereby dust, foreign matter, or the like adhering to all over the body of the passenger in the elevator car cannot be completely removed. For example, in Korean Patent Registration No. 10-1973897 "Apparatus for removing dust in elevator and method thereof", since dust adhered to the body of the passenger is removed by the wind blowing from above the passenger to the bottom of the car, it is difficult to remove dust adhered to pants of the passenger.

SUMMARY

An object of the present disclosure to provide an elevator having a function of removing dust, foreign matter, or the like adhering to various portions of an object aboard located inside the elevator car. The object is not limited to the technical problems described above, and other technical problems may be derived from the following description.

According to the present disclosure, there is provided an elevator having a function of removing dust adhered to an object aboard, including: a car which provides a boarding space, and in which a pair of air holes disposed in a diagonal direction each other at a same height of an inner space are formed; and a pair of fan modules that generates whirlwind rotating in the inner space of the car by ejecting air traveling from one of the pair of air hoes in a direction away from a center of the inner space of the car and ejecting air traveling from the other of the pair of air hoes in a direction away from the center of the inner space of the car. Dust adhered to the object aboard inside the car is separated from the object aboard by the whirlwind generated inside the car.

One fan module of the pair of fan modules may eject air traveling along a path which starts from the one air hole and moves gradually away from one inner side surface of entire inner side surfaces of the car between the one inner side surface and the center of the inner space of the car. The other fan module of the pair of fan modules may eject air along a path which starts from the other air hole and moves gradually away from another inner side surface of the entire inner side surfaces of the car between the another inner side surface facing the other inner side surface and the center of the inner space of the car.

The elevator may further include an upper fan module that is installed on an upper side of the car to eject air into the inner space of the car or suck air from the inner space of the car. The upper fan module may periodically and alternately perform ejection and suction of air, thereby periodically and alternately deriving an upward flow and a downward flow of the whirlwind generated by the pair of fan modules.

The elevator may further include at least one lower fan module that is installed on the lower side of the car to suck air in the inner space of the car when the upper fan module ejects air, and eject the air in the inner space of the car when the upper fan module sucks air.

Each of the air holes may be formed long in a straight line in a vertical direction of the car. Each of the fan modules may include an impeller that has a structure in which a plurality of straight blades having a bow-shaped cross section are arranged adjacent to each other in a circular shape to form a cylindrical shape; a fan housing that has a straight exhaust port corresponding to a shape of each of the air holes so as to communicate with each of the air holes in a form of a cover surrounding a part of the impeller; and a motor that rotate the impeller to eject air traveling from each of the air holes through the exhaust port of the fan housing in a direction away from the center of the inner space of the car.

Each of the fan modules may further include a nozzle having a structure in which a plurality of cylindrical flow path portions may be disposed in a rectangular frame, and a plurality of spiral protrusions may be formed in a longitudinal direction on an inner peripheral surface of each of the cylindrical flow path portions. The nozzle may be inserted into the exhaust port of the fan housing. The air ejected by the rotation of the impeller may travel along a curved path which moves from the each of the air holes gradually away from the each of the inner side surfaces between each inner surface of the car and the center of the inner space of the car by a plurality of spiral protrusions formed on the inner peripheral surface of each cylindrical flow path portion of the nozzle.

The each of the fan modules may further include a rectangular rod-shaped filter that is disposed on the other side of the impeller to purify external air of the each of the fan modules and supply the external air to the impeller; and a filter housing that has at least one intake port for sucking the external air of the each of the fan modules in a form of a cover surrounding an exposed portion of the filter disposed on the other side of the impeller.

The elevator may further include a plurality of louvers of which each is installed on the each of the air holes to open and close the each of the air holes by rotating a plurality of slats disposed adjacent to each other.

The elevator may further include a control panel that rotates the plurality of slats of each of the louvers to open the each of the air holes when a signal indicating that the object aboard inside the car is detected is received, and rotates the plurality of slats of each of the louvers to close the each of the air holes when the signal disappears.

The elevator may further include a plurality of louvers of which each is installed in the each of the air holes to open and close the each of the air holes by rotating a plurality of slats disposed adjacent to each other. Among the plurality of louvers, the plurality of slats of the louver installed in the one air hole may rotate at an angle that allows the air ejected from the one air hole to travel between the one inner side surface and the center of the inner space of the car. Among the plurality of louvers, the plurality of slats of the louver installed in the other air hole may rotate at an angle that allows the air ejected from the other air hole to travel between the other inner side surface and the center of the inner space of the car.

A pair of fan motors eject air traveling from one air hole of the pair of air holes disposed in a diagonal direction at the same height of the inner space in a direction away from the center of the inner space of the car, and simultaneously eject air traveling from the other air hole in a direction away from the center of the inner space of the car. Therefore, dust adhered to various portions of the object aboard located inside the car as a rotating whirlwind is generated in the inner space of the car by ejecting air traveling in a direction away from the center of the inner space of the car from the other air hole. Therefore, dust adhered to all parts of the object aboard can be completely removed as the whirlwind rotating in the inner space of the car is generated.

In the related art such as Korean Patent Registration No. 10-1973897 "Apparatus for removing dust in an elevator and method thereof", Korean Patent Registration No. 10-1144967 "Clean elevator car and its boarding room air flow control method", and Korean Utility Model Registration No. 20-0437981 "Elevator with clean room", since dust adhered to the body of the passenger is removed by mainly using the wind traveling straight on the inside of the car, it is difficult to completely remove the dust adhered all over the body of the passenger. The whirlwind rotating in the inner space of the car 1 can reach all over the object aboard, for example, all over the body of the passenger located inside the car 1 due to the rotational flow of air. Therefore, dust, foreign matter, or the like adhered to all over the object aboard can be completely removed.

The upper fan module can periodically and alternately perform ejection and suction of air, thereby periodically and alternately deriving the upward flow and the downward flow of the whirlwind generated by the pair of fan modules. Therefore, dust, foreign matter, or the like adhered to the depression of the object aboard can be completely removed as the wind also reaches the depressions of the object aboard, such as the upward depression and the downward depression of the object aboard. It is not limited to the effects as described above, and another effect may be derived from the following description.

BRIEF DESCRIPTION OF THE DRAWINGS

Various embodiments of the present disclosure will become more apparent in view of the attached drawings and accompanying detailed description, in which.

DETAILED DESCRIPTION OF THE EMBODIMENTS

Hereinafter, exemplary embodiments of the present disclosure will be described in detail with reference to the drawings. The exemplary embodiments of the present disclosure described below relate to an elevator having a function of removing dust, foreign matter, or the like adhered to various places of an object aboard located inside an elevator car, and the elevator car may be simply referred to as the "elevator". Hereinafter, a passenger, a wheelchair, an animal, or the like will be collectively referred to as the "object aboard".

Figure 1:
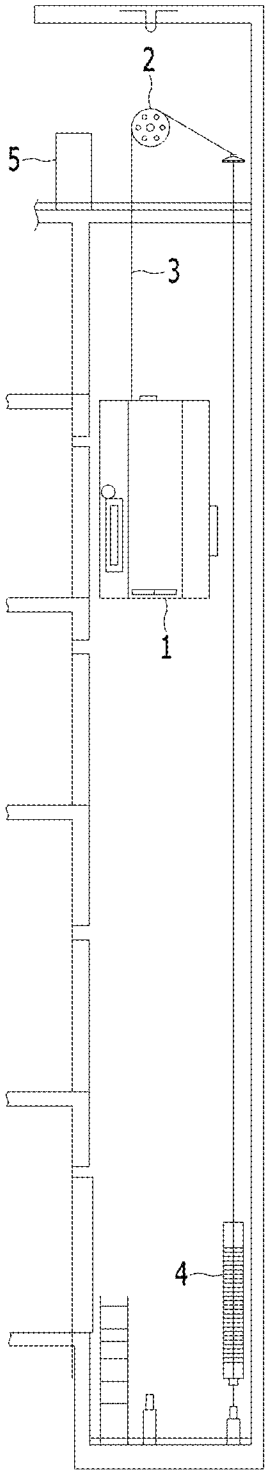
FIG. 1 is a configuration view of an elevator according to an exemplary embodiment of the present disclosure.

FIG. 1 is a configuration view of an elevator according to an exemplary embodiment of the present disclosure. Referring to FIG. 1, the elevator according to the present exemplary embodiment is configured of a car 1, a driving unit 2, a rope 3, a weight 4, and a control panel 5. The car 1 provides a boarding space for the object aboard. A representative example of the object aboard may be the passenger, as well as the wheelchair and the animal. The rope 3 has one end connected to the car 1 and the other end connected to the weight 4. The driving unit 2 is formed of a motor, a pulley, and the like, and moves the rope 3 to lift or lower the car 1. The control panel 5 controls driving of the driving unit 2 according to an operation of the passenger. Since a feature of the present exemplary embodiment is a function of removing dust adhered to the passengers on the car 1, a further detailed description of means for lifting or lowering the car 1 will be omitted.

Figure 2:
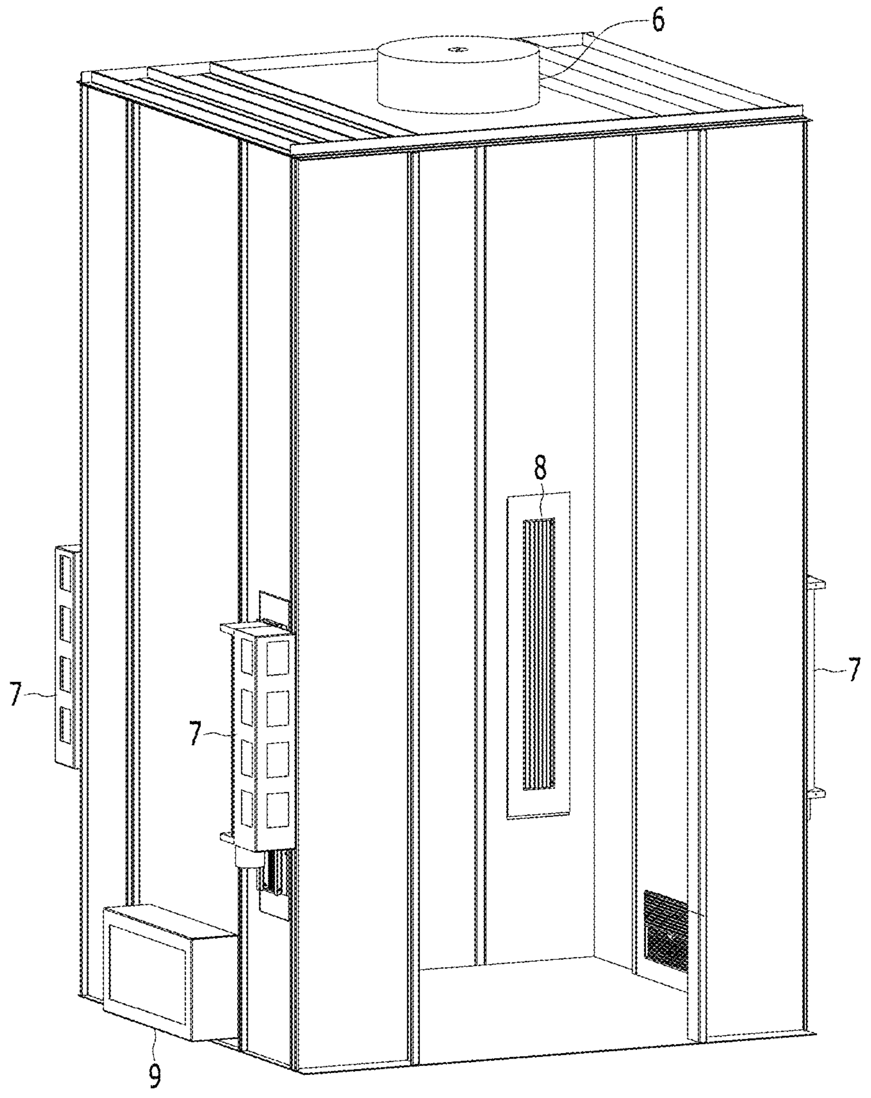
FIG. 2 is a front perspective view of a car 1 illustrated in FIG. 1.
Figure 3:
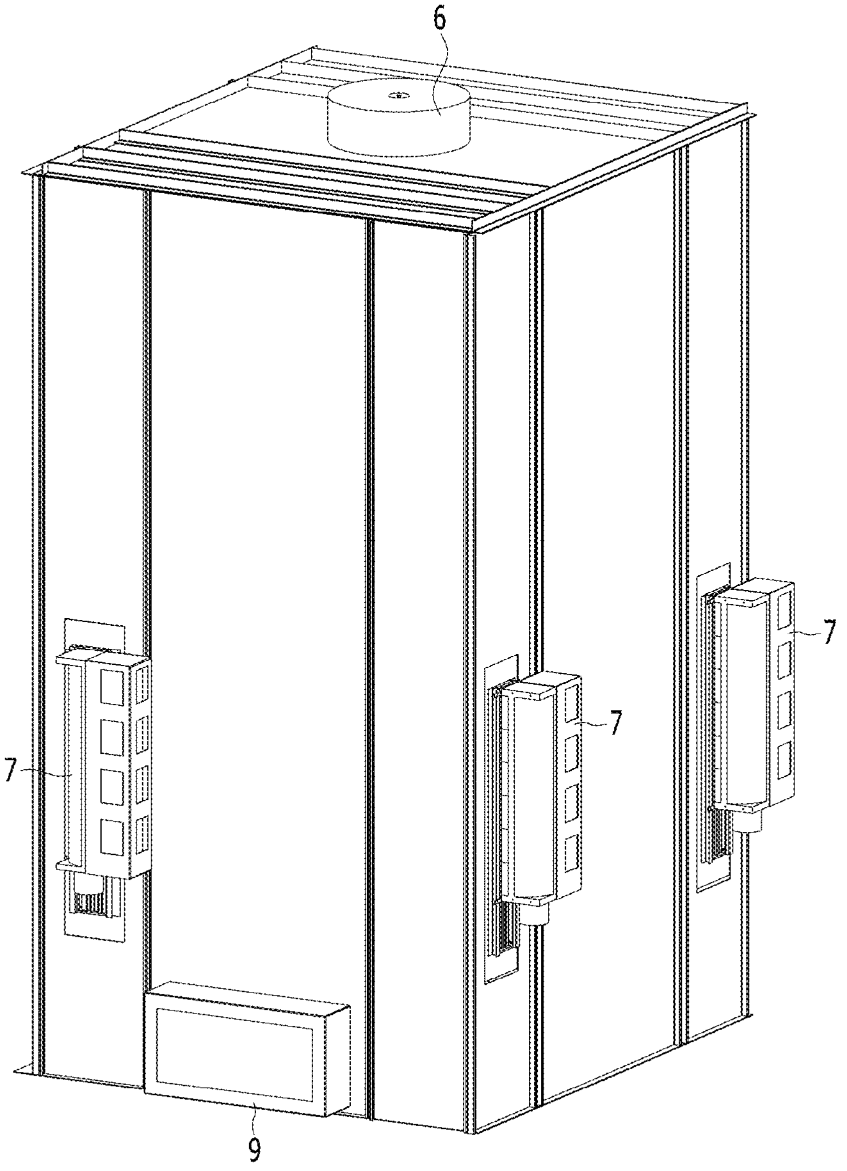
FIG. 3 is a rear perspective view of the car 1 illustrated in FIG. 1.
Figure 4:
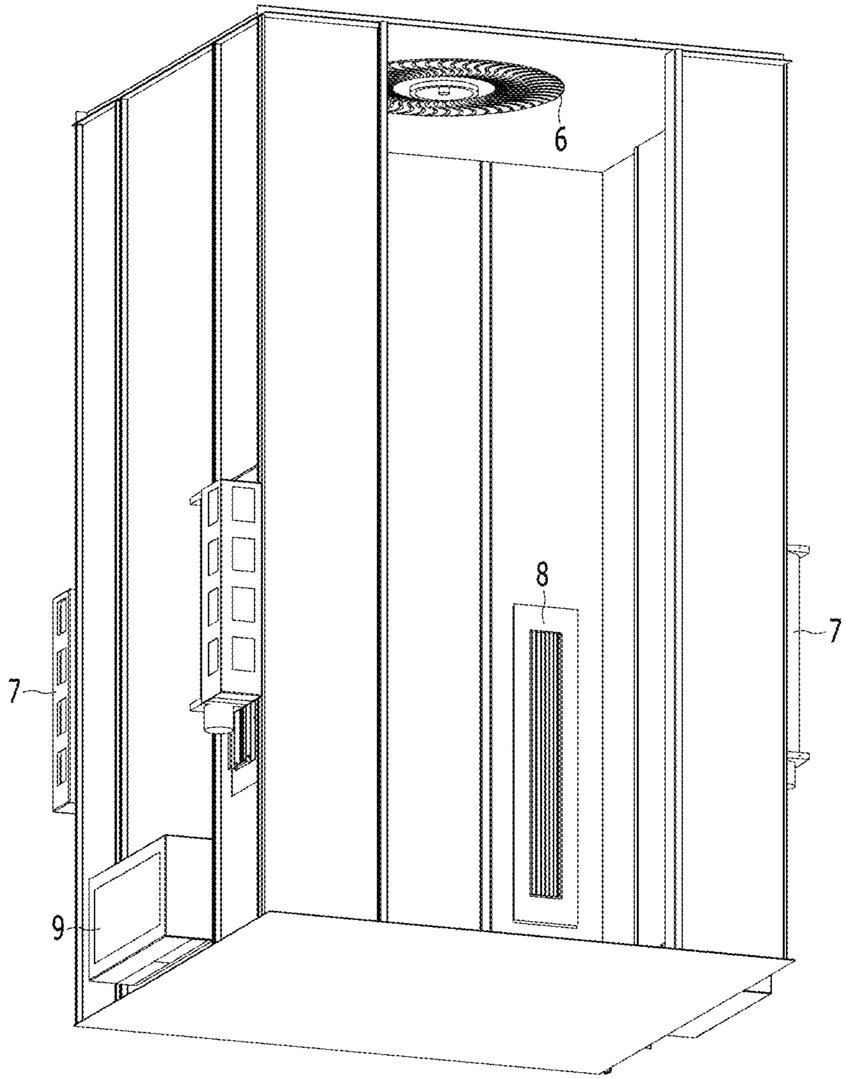
FIG. 4 is a bottom perspective view of the car 1 illustrated in FIG. 1.

FIG. 2 is a front perspective view of the car 1 illustrated in FIG. 1, FIG. 3 is a rear perspective view of the car 1 illustrated in FIG. 1, and FIG. 4 is a bottom perspective view of the car 1 illustrated in FIG. 1. Referring to FIG. 2, the elevator according to the present exemplary embodiment further includes one upper fan module 6, four side fan modules 7, four louvers 8, and two lower fan modules 9. The car 1 of the present exemplary embodiment has a square box shape configured of four side wall plates, a ceiling plate, and a bottom plate. The four side wall plates, which are adjacent to each other, are connected at a right angle, and are configured of a front wall plate, a rear wall plate, a left wall plate, and a right wall plate. An opening for the passenger to enter is formed in the front wall plate of the car 1, and an entrance door (not illustrated) that are electrically opened and closed according to an operation of the passenger is installed in the opening of the front wall plate of the car 1. In addition to the square box shape, the car 1 of the present exemplary embodiment may be implemented in various shapes capable of providing a boarding space such as a cylindrical shape and a hexagonal cylinder shape.

The control panel 5 of the present exemplary embodiment controls driving of the one upper fan module 6, the four side fan modules 7, the four louvers 8, and the two lower fan module 9 in addition to the driving unit 2. Control modes of the control panel 5 are formed of an air clean mode and a general air conditioning mode, and control the driving of the one upper fan module 6, the four side fan modules 7, the four louvers 8, and the two lower fan modules 9. The air clean mode is a mode that controls driving the one upper fan module 6, the four side fan modules 7, the four louvers 8, and the two lower fan modules 9 for removing dust adhered to the object aboard. The general air conditioning mode is a mode that controls the one upper fan module 6, the four side fan modules 7, the four louvers 8, and the two lower fan modules 9 for general air conditioning inside the car 1.

Figure 5:
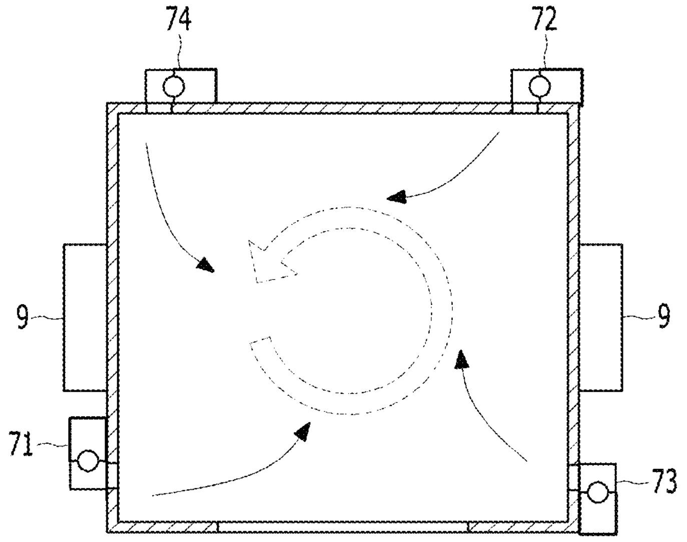
FIG. 5 is a cross-sectional view of the car 1 according to exemplary embodiments of the present disclosure.
Figure 5:
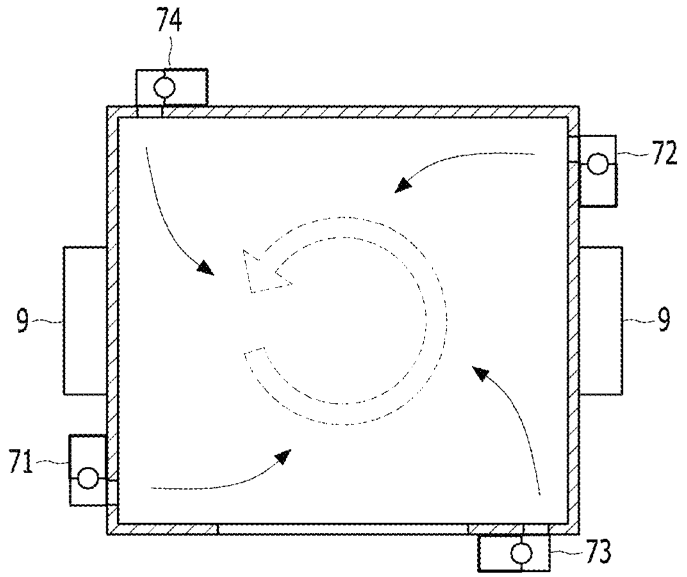

FIG. 5 is a cross-sectional view of the car 1 according to exemplary embodiments of the present disclosure, and a cross-sectional view of the car 1 in a direction viewed from below the car 1 is illustrated, in which (a) of FIG. 5 illustrates a cross-section of the car 1 illustrated in FIGS. 2 to 4, and (b) of FIG. 5 illustrates a cross-section of the car 1 according to another exemplary embodiment of the present disclosure. Referring to FIGS. 2 to 5, the car 1 has four air holes formed in a straight line in the vertical direction. Each pair of air holes are disposed in a diagonal direction to each other at the same height in the inner space of the car 1. As described below, a whirlwind is formed by air introduced into the car 1 through each pair of air holes. Shapes of the whirlwind illustrated in FIG. 5 are ideal shapes, and in reality, the whirlwind having various shapes such as an oval may be formed. The same applies to the examples illustrated in FIGS. 6 and 7.

In general, in a state where the entrance of the car 1 is opened, the entrance door is hidden inside the front wall plate of the car 1. Accordingly, it is not easy to form an air hole in the front wall plate of the car 1. In a case of the exemplary embodiment illustrated in FIGS. 2 to 4 and (a) of 5, for this reason, air holes are formed in the left wall plate, the right wall plate, and the rear wall plate of the car 1. In order to minimize the movement of the center of gravity of the car 1 due to the side fan module 7 installation, one air hole is formed in each of the left and right wall plates of the car 1, and two air holes are formed in the rear wall plate. Air hole formation for the front wall plate of the car 1 may be possible if the installation of the louver 8 as described below is omitted, and air holes are formed in both the front wall plate of the car 1 and the entrance door of the car 1.

The four side fan modules 7 form a pair of two each to generate the whirlwind inside the car 1. Referring to (a) of FIG. 5, among the four side fan modules 7, a first side fan module 71 installed at a front end of the left wall plate of the car 1 and a second side fan module 72 installed at a right end of the rear wall plate of the car 1 form a pair to generate the whirlwind inside the car 1. Among the four side fan modules 7, a third side fan module 73 installed at a front end of the right wall plate of the car 1 and a fourth side fan module 74 installed at a left end of the rear side wall plate of the car 1 form a pair to generate the whirlwind inside the car 1. The whirlwind may be generated with only the pair of side fan modules 7, but a stronger and more complete whirlwind is generated by the two pairs of side fan modules 7.

Referring to (b) of FIG. 5, among the four side fan modules 7, the first side fan module 71 installed at the front end of the left wall plate of the car 1 and the second side fan module 72 installed at the rear end of the right wall plate of the car 1 form the pair to generate the whirlwind inside the car 1. Among the four side fan modules 7, the third side fan module 73 installed at the right end of the front wall plate of the car 1 and the fourth side fan module 74 installed at the left end of the rear wall plate of the car 1 form the pair to generate the whirlwind inside the car 1. As the pair of side fan modules 7 are more accurately located in the diagonal direction of the inner space of the car 1 in the example of (b) of FIG. 5 than those in the example of (a) of FIG. 5, it can be said that the example of (b) of FIG. 5 is more preferable embodiment of the present disclosure. As described above, since it is difficult to form an air hole in the front wall plate of the car 1, it is highly likely to be implemented as illustrated in (a) of FIG. 5. Depending on the size and structure of the passage through which the car 1 passes, the example of (a) of FIG. 5 and the example of (b) of FIG. 5 are mixed and thereby there may be various examples in which a plurality of side fan modules 7 are disposed in the diagonal direction of the inner space of the car 1.

The pair of side fan modules 7 ejects air traveling from one air hole of the pair of air hoes disposed in the diagonal direction of the inner space of the car 1 to each other in a direction away from the center of the inner space of the car 1, and simultaneously ejects air traveling from the other air hole of the pair of air hoes in a direction away from the center of the inner space of the car 1, thereby generating the rotating whirlwind in the inner space of the car 1. The air of the two paths that are ejected from the pair of air holes disposed in the diagonal direction of the inner space of the car 1 and travel in a direction away from the center of the inner space of the car 1 forms the whirlwinds of dotted lines form illustrated in FIG. 5.

According to the example illustrated in (a) of FIG. 5, the first side fan module 71 ejects air traveling from the first air hole formed at the front end of the left wall plate of the car 1 in the direction away from the center of the inner space of the car 1, and ejects air traveling from the second air hole formed at the right end of the rear wall plate of the car 1 in the direction away from the center of the inner space of the car 1, thereby generating the whirlwind. The third side fan module 73 ejects air traveling from the third air hole formed at the front end of the right wall plate of the car 1 in the direction away from the center of the inner space of the car 1, and ejects air traveling from the second air hole formed at the left end of the rear wall plate of the car 1 in the direction away from the center of the inner space of the car 1, thereby generating the whirlwind.

The dust adhered to the object aboard inside the car 1 is separated from the object aboard by the whirlwind generated inside the car 1. In the related art such as Korean Patent Registration No. 10-1973897 "Apparatus for removing dust in an elevator and method thereof", Korean Patent Registration No. 10-1144967 "Clean elevator car and its boarding room air flow control method", and Korean Utility Model Registration No. 20-0437981 "Elevator with clean room", since dust adhered to the body of the passenger is removed by mainly using the wind traveling straight on the inside of the car, it is difficult to completely remove the dust adhered all over the body of the passenger. The whirlwind rotating in the inner space of the car 1 can reach all over the object aboard, for example, all over the body of the passenger located inside the car 1 due to the rotational flow of air. Therefore, dust, foreign matter, or the like adhered to all over the object aboard can be completely removed.

According to the example illustrated in (b) of FIG. 5, the first side fan module 71 ejects the air traveling from the first air hole formed at the front end of the left wall plate of the car 1 in the direction away from the center of the inner space of the car 1, and the second side fan module 72 ejects the air traveling from the second air hole formed at the rear end of the right wall plate of the car 1 in the direction away from the center of the inner space of the car 1, thereby generating the whirlwind. The third side fan module 73 ejects the air traveling from the third air hole formed at the right end of the front side wall plate of the car 1 in the direction away from the center of the inner space of the car 1, and the fourth side fan module 74 ejects the air traveling from the second air hole formed at the left end of the rear wall plate of the car 1 in the direction away from the center of the inner space of the car 1, thereby generating the whirlwind.

In more detail, any one side fan module 7 of the pair of side fan modules 7 ejects the air traveling along a path which starts from one air hole and moves gradually away from one of the inner side surfaces between one inner side surface of all the inner side surfaces and the center of the inner space of the car 1. The other side fan module 7 ejects the air traveling along a path which starts from the other air hole and moves gradually away from the another inner side surface between the other inner side surface facing one inner side surface of all the inner side surfaces and the center of the inner space of the car 1.

According to the example illustrated in (a) of FIG. 5, the first side fan module 71 ejects the air traveling along the path which starts from the first air hole formed at the front end of the left wall plate of the car 1 and moves gradually away from the inner surface of the front wall plate of the car 1 between the inner surface of the front wall plate of the car 1 and the center of the inner space of the car 1. The second side fan module 72 ejects the air traveling along the path which starts from the second air hole formed at the right end of the rear wall plate of the car 1 and moves gradually away from the inner surface of the rear wall plate of the car 1 between the inner surface of the rear wall plate of the car 1 and the center of the inner space of the car 1. The third side fan module 73 ejects the air traveling along the path which starts from the third air hole formed at the front end of the right wall plate of the car 1 and moves gradually away from the inner surface of the right wall plate of the car 1 between the inner surface of the right wall plate of the car 1 and the center of the inner space of the car 1. The fourth side fan module 74 ejects the air traveling along the path which starts from the fourth air hole formed at the left end of the rear wall plate of the car 1 and moves gradually away from the inner surface of the left wall plate of the car 1 between the inner surface of the left wall plate of the car 1 and the center of the inner space of the car 1.

According to the example illustrated in (b) of FIG. 5, the first side fan module 71 ejects the air traveling along the path which starts from the first air hole formed at the front end of the left wall plate of the car 1 and moves gradually away from the inner surface of the front wall plate of the car 1 between the inner surface of the front wall plate of the car 1 and the center of the inner space of the car 1. The second side fan module 72 ejects the air traveling along the path which starts from the second air hole formed at the rear end of the right wall plate of the car 1 and moves gradually away from the inner surface of the rear wall plate of the car 1 between the inner surface of the rear wall plate of the car 1 and the center of the inner space of the car 1. The third side fan module 73 ejects the air traveling along the path which starts from the third air hole formed at the left end of the front wall plate of the car 1 and moves gradually away from the inner surface of the right wall plate of the car 1 between the inner surface of the right wall plate of the car 1 and the center of the inner space of the car 1. The fourth side fan module 74 ejects the air traveling along the path which starts from the fourth air hole formed at the left end of the rear wall plate of the car 1 and moves gradually away from the inner surface of the left wall plate of the car 1 between the inner surface of the left wall plate of the car 1 and the center of the inner space of the car 1.

Figure 6:
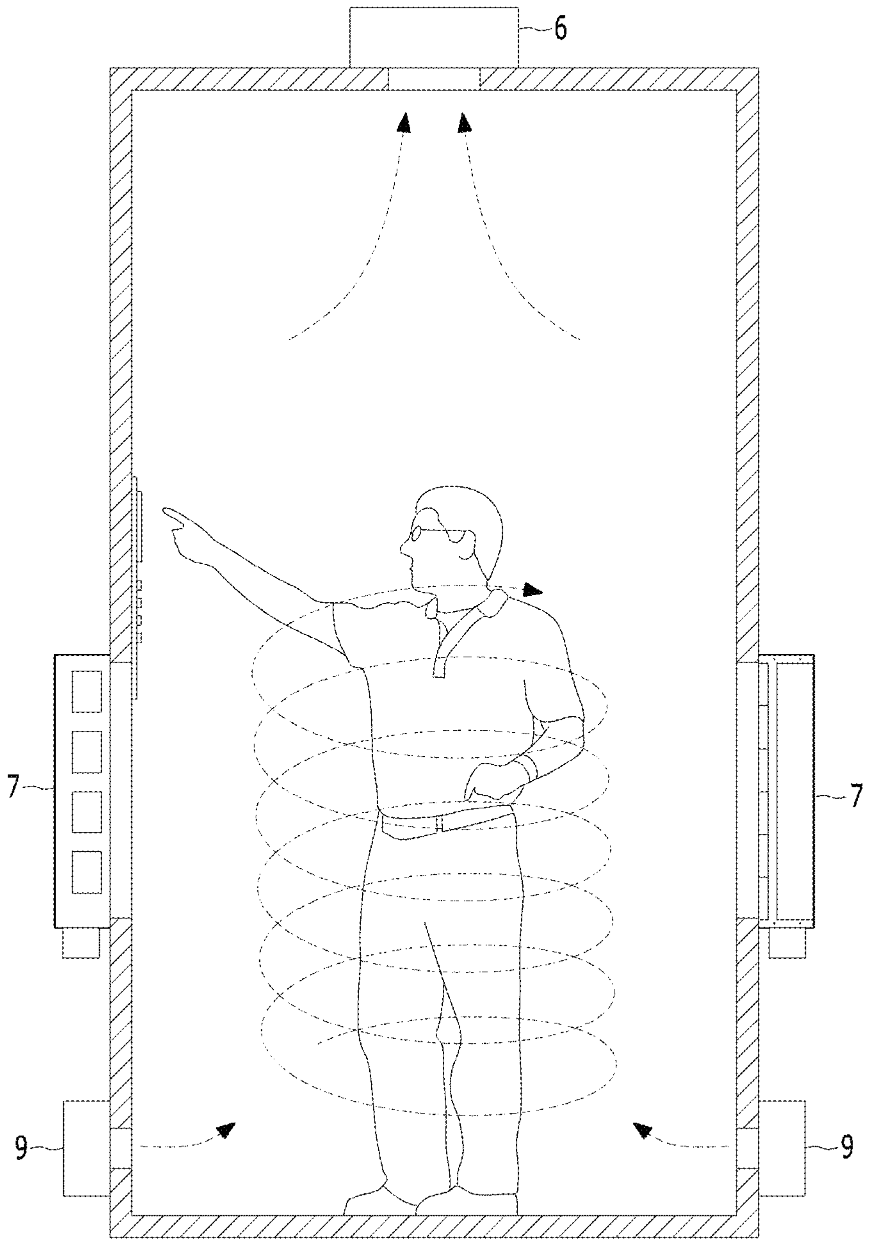
FIG. 6 is a view illustrating an example of formation of a downward spiral whirlwind inside the car 1 illustrated in FIGS. 2 to 5.

FIG. 6 is a view illustrating an example of formation of a downward spiral whirlwind inside the car 1 illustrated in FIGS. 2 to 5, and FIG. 7 is a view illustrating an example of formation of an upward spiral whirlwind inside the car 1 illustrated in FIGS. 2 to 5. The upper fan module 6 is installed on the upper side of the car 1, that is, on the ceiling plate of the car 1, and ejects the air into the inner space of the car 1 or sucks the air from the inner space of the car 1 according to the control of the control panel 5. The two lower fan modules 9 are installed on the lower side of the car 1, that is, at the lower end of the left and right wall plates, and each lower fan module 9 sucks the air from the inner space of the car 1 when the upper fan module 6 ejects the air, and ejects the air to the inner space of the car 1 when the upper fan module 6 sucks the air according to the control of the control panel 5. In the former case, the air flow from the upper fan module 6 to the lower fan module 9 generates inside the car 1, and in the latter case, the air flow from the lower fan module 9 to the upper fan module 6 generates inside the car 1.

Each of the upper fan module 6 and the two lower fan modules 9 is configured of a propeller, a motor, a cover for covering them, and the like. Since such a configuration of each of the upper fan module 6 and the two lower fan modules 9 is known to those of ordinary skill in the art to which the present exemplary embodiment belongs, detailed descriptions will be omitted. Each of the upper fan module 6 and the two lower fan modules 9 may further include a filter to purify the air sucked thereby.

As illustrated in FIG. 6, when the upper fan module 6 ejects air and the lower fan module 9 sucks air in a state where the whirlwind is generated by the four side fan modules 7, the whirlwind is changed into a whirlwind flowing downward while rotating in a spiral type by the four side fan modules 7. The whirlwind generated by the four side fan modules 7 hardly touches a portion in a form of a downward depression of the object aboard, for example, an inside of a pants pocket of the passenger. Therefore, it is difficult to remove dust adhered to the inside of the pants pocket of the passenger. Since the downward spiral whirlwind as illustrated in FIG. 6 penetrates the inside of the pants pocket of the passenger, it is possible to easily remove dust adhered to the inside of the pants pocket of the passenger.

Figure 7:
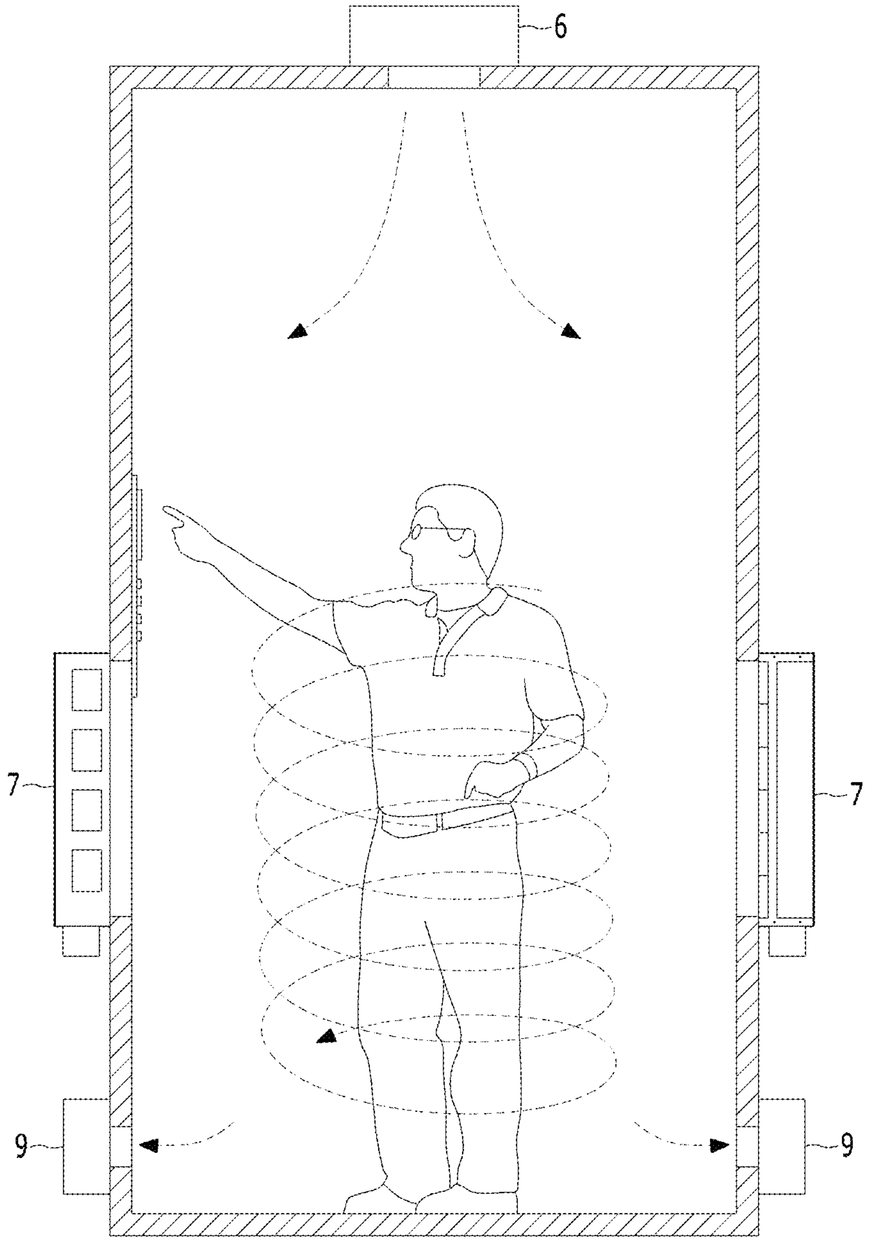
FIG. 7 is a view illustrating an example of formation of an upward spiral whirlwind inside the car 1 illustrated in FIGS. 2 to 5.

As illustrated in FIG. 7, when the lower fan module 6 ejects air and the upper fan module 9 sucks air in a state where the whirlwind is generated by the four side fan modules 7, the whirlwind is changed into a whirlwind flowing upward while rotating in a spiral type by the four side fan modules 7. The whirlwind generated by the four side fan modules 7 has a circular rotating whirlwind shape, which hardly touches an upward depressed portion of the object aboard, for example, the armpit of the passenger. Therefore, it is difficult to remove dust adhered to the armpit of the passenger. Since the upward spiral whirlwind as illustrated in FIG. 7 touches the armpit of the passenger, it is possible to easily remove dust adhered to the armpit of the passenger.

The upper fan module 6 periodically and alternately executes the ejection and suction of the air according to the control of the control panel 5, and the lower fan module 9 alternately executes the suction of the air when the air ejection of the upper fan module 6 and the ejection of the air during the air suction of the upper fan module 6 according to the control of the control panel 5. Therefore, the upward and downward flows of the whirlwinds generated by the two pairs of side fan modules 7 are periodically alternately induced. Accordingly, dust, foreign matter, or the like adhered to the depression of the object aboard can be completely removed as the wind also reaches the depressions of the object aboard, such as the upward depression and the downward depression of the object aboard.

Figure 8:
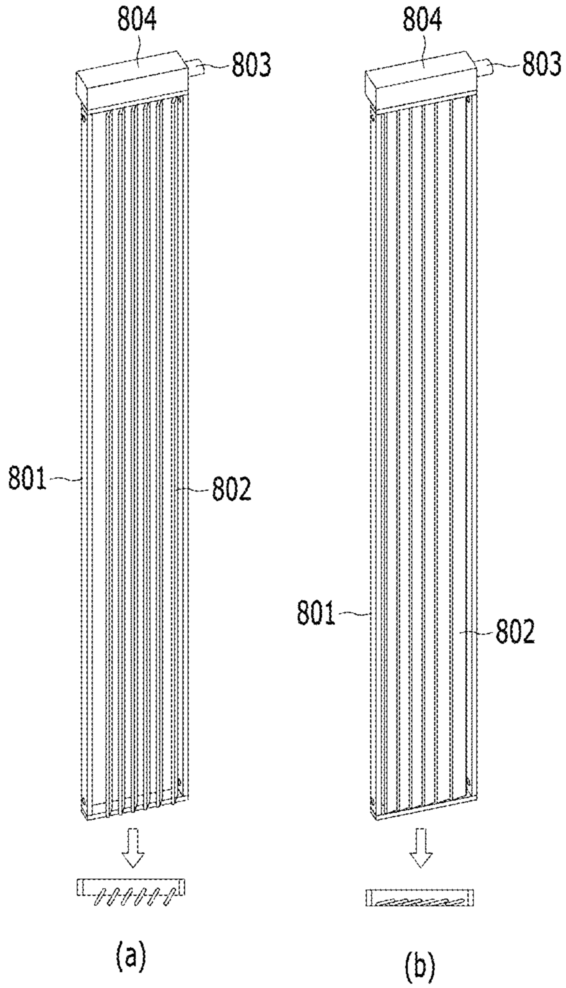
FIG. 8 is a detailed view of each louver 8 illustrated in FIGS. 2 to 4.

FIG. 8 is a detailed view of each of the louvers 8 illustrated in FIGS. 2 to 4. Each of the four louvers 8 is installed in each of the four air holes formed in the car 1 and opens and closes each of the pair of air holes by rotating a plurality of slats 802 disposed adjacent to each other. A state where each of the air holes is opened as the plurality of slats 802 are rotated so that the plurality of slats 802 are separated from each other is illustrated in (a) of FIG. 8. A state where each of the air holes is closed as the plurality of slats 802 are rotated so that the plurality of slats 802 overlap each other is illustrated in (b) of FIG. 8. Referring to FIG. 8, each of the louvers 8 is configured of a guide frame 801, the plurality of slats 802, a motor 803, and a gearbox 804. In addition to the gearbox 804, the plurality of slats 802 may be rotated by using a pulley, a motor, or the like.

The guide frame 801 has a shape of a rectangular frame configured of two short sides and two long sides, and a plurality of through-holes are formed in each of the two short sides in a thickness direction. The plurality of slats 802 are straight flat plates that are as long as the length of each air hole, and circular fins protrude from both ends of the slat in the longitudinal direction. In a structure in which two circular fins of each slat 802 are inserted into the through-holes of the two short side of the guide frame 801, the plurality of slats 802 are disposed adjacent to each other inside the guide frame 801. In this way, the guide frame 801 serves to guide the rotation of each slat 802. The motor 803 rotates the plurality of slats 802 through the gearbox 804. The gearbox 804 transmits a rotational force of the motor 803 to each slat 802 by using a gear combination. One of the two circular fins of each slat 802 is coupled with a gear to receive the rotational force of the motor 803.

As illustrated in (a) of FIG. 8, the angle of air ejection from each air hole may be adjusted according to the rotation angle of the plurality of slats of each louver 8. For example, in (a) of FIG. 5, the plurality of slats 802 of the first louver 8 installed in the first air hole formed at the front end of the left wall plate of the car 1 are rotated at an angle such that the air ejected from the first air hole travels between the inner surface of the front wall plate of the car 1 and the center of the inner space of the car 1. The plurality of slats 802 of the second louver 8 installed in the second air hole formed at the right end of the rear wall plate of the car 1 are rotated at an angle such that the air ejected from the second air hole travels between the inner surface of the rear wall plate of the car 1 and the center of the inner space of the car 1. The plurality of slats 802 of the third louver 8 installed in the third air hole formed at the front end of the right wall plate of the car 1 are rotated at an angle such that the air ejected from the third air hole travels between the inner surface of the rear wall plate of the car 1 and the center of the inner space of the car 1. The plurality of slats 802 of the first louver 8 installed in the fourth air hole formed at the left end of the rear wall plate of the car 1 are rotated at an angle such that the air ejected from the fourth air hole travels between the inner surface of the left wall plate of the car 1 and the center of the inner space of the car 1.

The control panel 5 controls the rotation of the plurality of slats 802 of each louver 8. In more detail, the control panel 5 rotates the plurality of slats of each louver 8, and thereby each air hole of the car 1 is opened according to the air clean mode when receiving a signal indicating that the object aboard inside the car 1 is detected from a sensor (not illustrated) installed inside the car 1, and controls driving of the one upper fan module 6, the four side fan modules 7, and the two lower fan modules 9, and thereby the air is ejected strongly from the one upper fan module 6, the four side fan modules 7, and the two lower fan modules 9. The control panel 5 rotates the plurality of slats of each louver 8, and thereby each air hole of the car 1 is closed according to the general air conditioning mode when a signal indicating that the object aboard inside the car 1 disappears is detected from the sensor, and controls driving of the one upper fan module 6 and two lower fan modules 9, and thereby the air is ejected weakly from the one upper fan module 6 and the two lower fan modules 9, and the driving of the four side fan modules 7 is stopped.

Since the sensor for detecting the object aboard inside the car 1 is an electronic component known to those of ordinary skill in the art to which the present exemplary embodiment belongs, further detailed description will be omitted. In addition to the sensor-based mode switching method described above, the control panel 5 may control the air clean mode from a time point when the door of the car 1 is opened and closed to a time point when the door of the car 1 is opened and closed again, and may also control the general air conditioning mode in other times. Since the door of the car 1 is frequently opened and closed even when boarding is not actually performed, energy waste may occur in the case of the mode switching method according to the door opening and closing.

Figure 9:
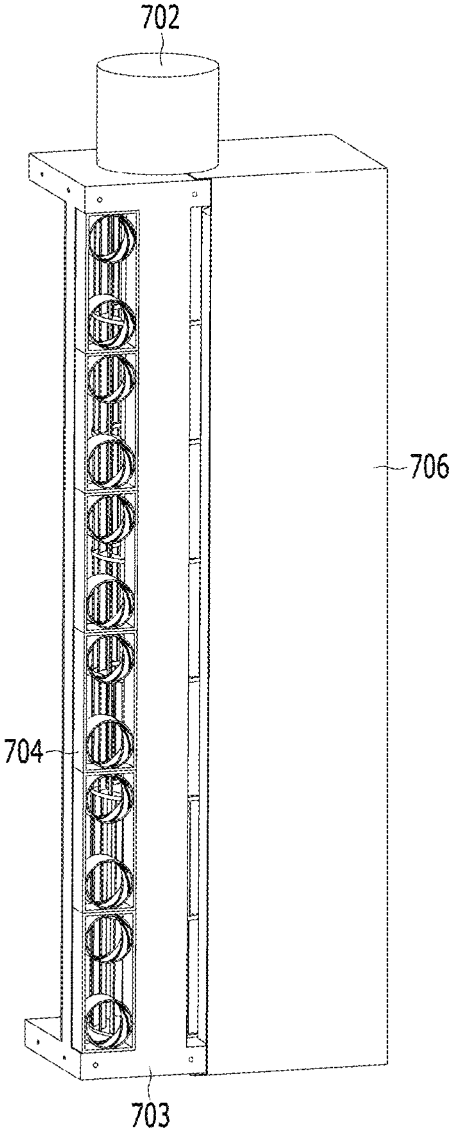
FIG. 9 is a detailed view of each side fan module 7 illustrated in FIGS. 2 to 4.
Figure 10:
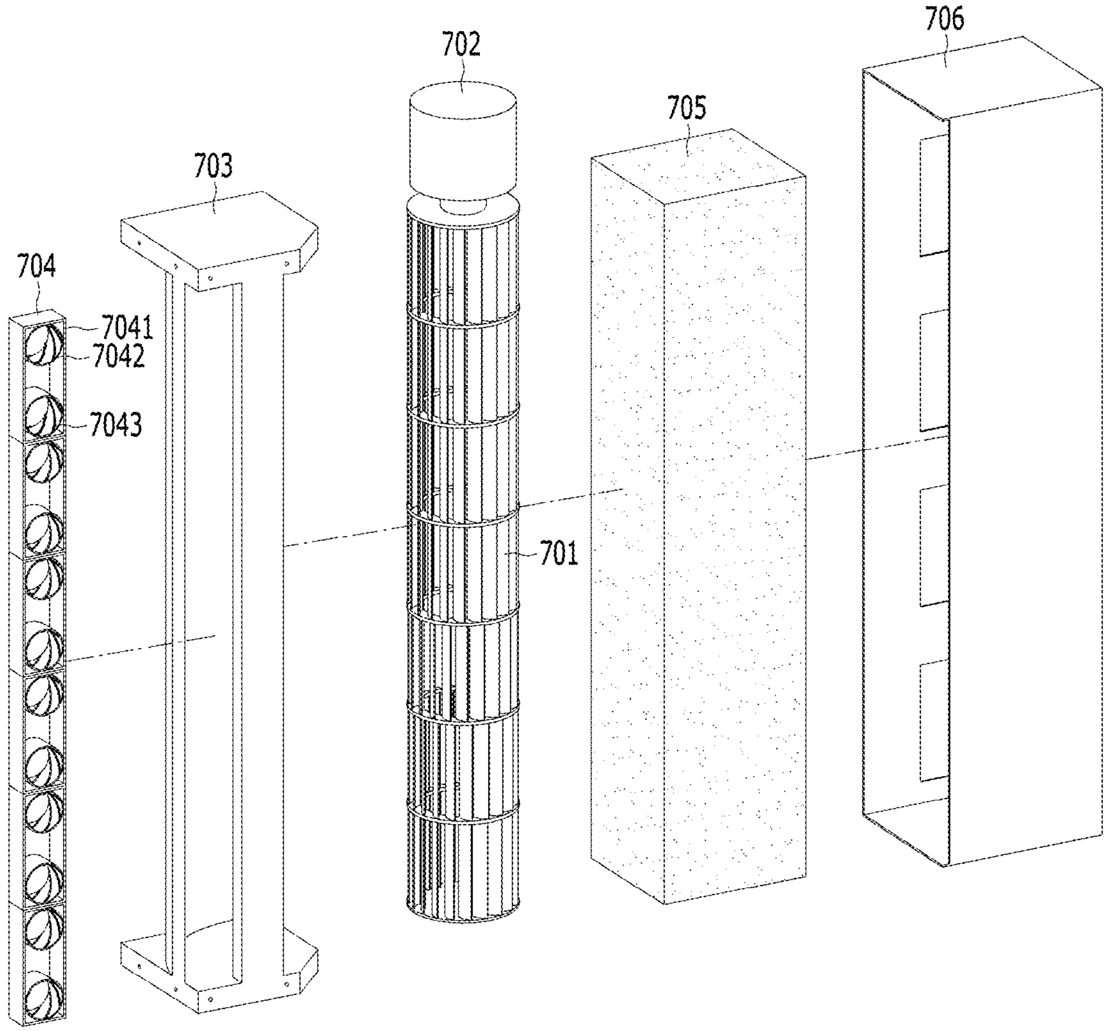
FIG. 10 is an exploded view of each side fan module 7 illustrated in FIG. 9.

FIG. 9 is a detailed view of each side fan module 7 illustrated in FIGS. 2 to 4, and FIG. 10 is an exploded view of each side fan module 7 illustrated in FIG. 9. Referring to FIGS. 9 and 10, each side fan module 7 is configured of an impeller 701, a motor 702, a fan housing 703, a nozzle 704, a filter 705, and a filter housing 706. Each side fan module 7 may be attached around each air hole of the car 1 by using a bracket, or may be attached by a welding method.

The impeller 701 has a structure in which a plurality of straight blades having a bow-shaped cross section are arranged adjacent to each other in a circular shape to form a cylindrical shape. As illustrated in FIG. 10, the impeller 701 may be implemented as a structure in which several assemblies of the plurality of blades arranged in a circle are connected or be implemented as a single assembly in which a plurality of blades that are as long as the entire length of the impeller 701 illustrated in FIG. 10 are arranged in a circle. The fan housing 703 has a cover shape surrounding a part of the impeller 701 and is formed of a straight exhaust port corresponding to the shape of each air hole so as to communicate with each air hole of the car 1. The motor 702 rotates the impeller 701 so that air traveling in a direction away from the center of the inner space of the car 1 is ejected from each air hole through the exhaust port of the fan housing 703. The fan housing 703 covers approximately half of the impeller 701.

As described above, since each air hole is formed in a long straight line type in the vertical direction of the car 1, air having a uniform wind speed over the entire air hole area cannot be ejected from each air hole by a fan using a general propeller. In the present exemplary embodiment, the cylindrical impeller 701 is used in which the plurality of straight blades having the bow-shaped cross section are arranged adjacent to each other in a circular shape, so that air having a uniform wind speed over the entire air hole area can be ejected. In particular, since each blade has the bow-shaped cross section along the rotation direction of the impeller 701, the speed of the air ejected by the rotation of the impeller 701 can be increased.

The nozzle 704 has a structure in which a plurality of cylindrical flow path portions 7042 are disposed in a rectangular frame 7041, and a plurality of spiral protrusions 7043 are formed on an inner peripheral surface of the cylindrical flow path portion 7042 in a longitudinal direction. The nozzle 704 having such a structure is inserted into the exhaust port of the fan housing 703. The air ejected by the rotation of the impeller 701 becomes wind that rotates in a spiral shape by a plurality of spiral protrusions 7043 formed on the inner peripheral surface of each cylindrical flow path portion 7042 of the nozzle 704. When the wind rotating in the spiral shape travels along a certain surface, the wind travels while bending in the direction of rotation. Accordingly, the air ejected by the rotation of the impeller 701 of each side fan module 7 travels along a curved path by a plurality of spiral protrusions 7043 formed on the inner peripheral surface of each cylindrical flow path portion 7042 of the nozzle 704, from each air hole and moving gradually away from each inner surface between each inner surface of the car 1 and the center of the inner space of the car 1.

Here, any one inner surface may be the front wall plate, the rear wall plate, the left wall plate, or the right wall plate. The path, along which the air ejected from the four side fan modules 7 travels, becomes the curved path as described above, and will be replaced with the contents described above with reference to FIG. 5. When comparing (a) and (b) of FIG. 5, it can be seen that the shapes of the curved paths of the air ejected from the second side fan module 72 and the third side fan module 73 are different from each other. The rotation direction of the spiral protrusions of the nozzles 704 of the second side fan module 72 and the third side fan module 73 illustrated in (a) of FIG. 5 and the rotation direction of the spiral protrusion of the nozzles 704 of the fan module 72 and the third side fan module 73 are reversed, the air ejected from the four side fan modules 7 travels in the curved paths as illustrated in (a) and (b) of FIG. 5.

As described above, depending on the size and structure of the passage through which the car 1 passes, the four side fan modules 7 may not be installed at the optimal positions as illustrated in (b) of FIG. 5. In this case, the four side fan modules 7 are optimal as illustrated in (b) of FIG. 5 may be installed at positions closest to the optimal positions as illustrated in (b) of FIG. 5 according to the size and structure of the passage through which the car 1 passes, such as the positions as illustrated in (a) of FIG. 5. The whirlwind that approaches an ideal shape as illustrated in FIG. 5 may be generated through adjustment of the rotation angle of the slat 802 of each louver 8 and adjustment of the rotation direction of the spiral protrusion of the nozzle 704 of each side fan module 7.

The filter 705 is disposed on the other side of the of the impeller 701, that is, on the side of the exposed portion of the impeller 701 covered by the fan housing 703 to purify the external air of each side fan module 7 and supply the purified air to the impeller 701. The filter 705 may be a rectangular rod-shaped filter and be implemented by staking a nonwoven fabric or the like. The filter housing 706 has a cover shape surrounding the exposed portion of the filter 705 disposed on the other side of the impeller 701 and is formed of a plurality of intake ports for sucking the external air of each side fan module 7. The plurality of intake ports of the filter housing 706 may be implemented as one large intake port. As illustrated in FIG. 9, the filter housing 706 is coupled with the fan housing 703 in a manner that is covered with the fan housing 703 by using bolts or the like. Accordingly, the filter housing 706 can be separated by a pulling type from the fan housing 703, and thereby replacement of the filter 705 is easy.

As described above, since the impeller 701 has the structure in which the plurality of straight blades having the bow-shaped cross section are arranged adjacent to each other in the circular shape to form the cylindrical shape, air can be introduced into the impeller 701 at various angles. Accordingly, in order to purify the air flowing into the impeller 701, the rectangular rod-shaped filter 705 that is as long as the length of each air hole of the car 1 may be used, and as a result, a sufficient amount of purified air can be supplied to the inside of the car 1 to create the whirlwind.

Hereinabove, the present disclosure is described centered on the preferred exemplary embodiments. Those of ordinary skill in the art to which the present disclosure pertains will be able to understand that the present disclosure may be implemented in a modified form without departing from the essential characteristics of the present disclosure. Therefore, the disclosed exemplary embodiments should be considered from an illustrative point of view rather than a limiting point of view. The scope of the present disclosure is illustrated in the claims rather than the above description, and all differences within the scope equivalent thereto should be construed as being included in the present disclosure.

What is claimed is:

1. An elevator having a function of removing dust adhered to an object aboard, comprising:

a car which provides a boarding space, and in which a pair of air holes disposed in a diagonal direction from each other at a same height of an inner space are formed; and a pair of fan modules that generates whirlwind rotating in the inner space of the car by ejecting air traveling from one of the pair of air hoes in a direction away from a center of the inner space and ejecting air traveling from a second of the pair of air holes in a direction away from the center of the inner space of the car, wherein the dust adhered to the object aboard inside the car is separated from the object aboard by the whirlwind generated inside the car, wherein each of the air holes is formed long in a straight line in a vertical direction of the car, and wherein each of the fan modules includes:

an impeller that has a structure in which a plurality of straight blades having a bow-shaped cross section are arranged adjacent to each other in a circular shape to form a cylindrical shape;

a fan housing that has a straight exhaust port corresponding to a shape of each of the air holes so as to communicate with each of the air holes in a form of a cover surrounding a part of the impeller; and a motor that rotates the impeller to eject air traveling from each of the air holes through the exhaust port of the fan housing in a direction away from the center of the inner space of the car.

2. The elevator of claim 1, wherein one fan module of the pair of fan modules ejects the air traveling along a path which starts from the one air hole of the pair of air holes and moves gradually away from one inner side surface of entire inner side surfaces of the car between the one inner side surface and the center of the inner space of the car, and the other fan module of the pair of fan modules ejects the air along a path which starts from a second air hole of the pair of air holes and moves gradually away from another inner side surface of the entire inner side surfaces of the car between the another inner side surface facing the other inner side surface and the center of the inner space of the car.

3. The elevator of claim 2, further comprising:

a plurality of louvers of which each is installed in the each of the air holes to open and close the each of the air holes by rotating a plurality of slats disposed adjacent to each other, wherein, among the plurality of louvers, the plurality of slats of the louver installed in the one air hole of the pair of air holes rotate at an angle that allows the air ejected from the one air hole of the pair of air holes to travel between the one inner side surface and the center of the inner space of the car, and wherein, among the plurality of louvers, the plurality of slats of the louver installed in the second air hole of the pair of air holes rotates at an angle that allows the air ejected from the second air hole of the pair of air holes to travel between the other inner side surface and the center of the inner space of the car.

4. The elevator of claim 1, further comprising:

an upper fan module that is installed on an upper side of the car to eject air into the inner space of the car or suck air from the inner space of the car, wherein the upper fan module periodically and alternately performs ejection and suction of air, thereby periodically and alternately deriving an upward flow and a downward flow of the whirlwind generated by the pair of fan modules.

5. The elevator of claim 4, further comprising:

at least one lower fan module that is installed on the lower side of the car to suck air in the inner space of the car when the upper fan module ejects air, and eject the air in the inner space of the car when the upper fan module sucks air.

6. The elevator of claim 1, wherein each of the fan modules further includes a nozzle having a structure in which a plurality of cylindrical flow path portions are disposed in a rectangular frame, and a plurality of spiral protrusions are formed in a longitudinal direction on an inner peripheral surface of each of the cylindrical flow path portions, wherein the nozzle is inserted into the exhaust port of the fan housing, and wherein the air ejected by the rotation of the impeller travels along a curved path which moves from the each of the air holes gradually away from the each of the inner side surfaces between each inner surface of the car and the center of the inner space of the car by a plurality of spiral protrusions formed on the inner peripheral surface of each cylindrical flow path portion of the nozzle.

7. The elevator of claim 6, wherein the each of the fan modules further includes:

a rectangular rod-shaped filter that is disposed on the other side of the impeller to purify external air of the each of the fan modules and supply the external air to the impeller; and a filter housing that has at least one intake port for sucking the external air of the each of the fan modules in a form of a cover surrounding an exposed portion of the filter disposed on the other side of the impeller.

8. The elevator of claim 1, further comprising:

a plurality of louvers installed on each air hole of the pair of air holes to open and close the air hole by rotating a plurality of slats disposed adjacent to each other.

9. The elevator of claim 8, further comprising:

a control panel that rotates the plurality of slats of each of the louvers to open the each of the air holes when a signal indicating that the object aboard inside the car is detected is received, and rotates the plurality of slats of each of the louvers to close the each of the air holes when the signal disappears.

* * * * *